Sept. 6, 1960        F. C. DE RONDE        2,951,998
WAVEGUIDE VARIABLE IMPEDANCE APPARATUS
Filed March 13, 1957
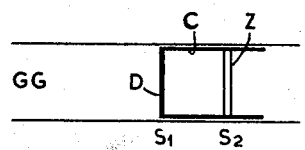
FIG.1ª
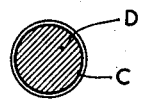
FIG.1ᵇ
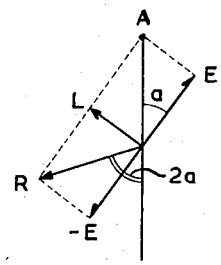
FIG.1ᶜ
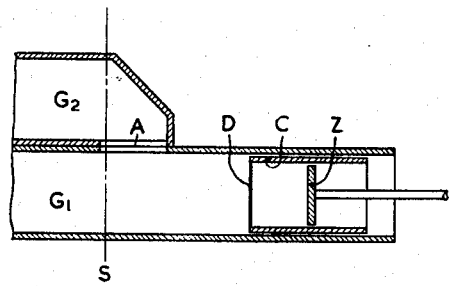
FIG.2ª
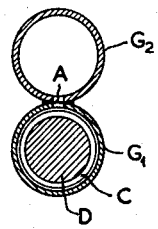
FIG.2ᵇ
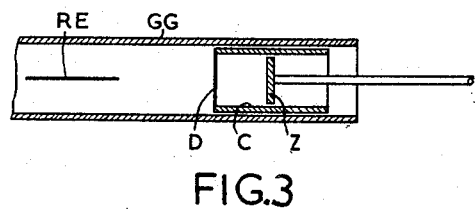
FIG.3
INVENTOR
FRANS CHRISTIAAN DE RONDE
BY
AGENT United States Patent Office 2,951,998
Patented Sept. 6, 1960

2,951,998
WAVEGUIDE VARIABLE IMPEDANCE APPARATUS

Frans Christiaan De Ronde, Eindhoven, Netherlands, assignor to North American Philips Company, Inc., New York, N.Y., a corporation of Delaware Filed Mar. 13, 1957, Ser. No. 645,818

Claims priority, application Netherlands Apr. 19, 1956

2 Claims. (Cl. 333—81)

The invention relates to devices in wave guides for varying the direction of polarization of waves supplied with a given direction of polarization.

In the device according to the invention, the wave guide contains a piston and a wire grid arrangement, in which the direction of the wires is at an angle between 0 and 90° with the direction of polarization of the incident waves, the grid arrangement being positioned in front of the piston at a relative distance corresponding to a quarter of wave length, whilst in front of the wire grid, as reckoned with respect to the direction of the incident waves, means are provided for completely extracting wave energy from the wave guide, the direction of polarization of which is at right angles to that of the incident waves.

The device according to the invention is particularly suited for use in constructing a variable phase shifter, a variable terminating impedance, or a variable directional coupling device.

It is to be noted that a known prior-art device for closing a wave guide to be free from reflection in which use is made of a wire grid and a piston, resistance elements are arranged in front of the wire grid and also between the wire grid and the piston for extracting wave energy from the wave guide. However, in this known device, rotation of the polarization plane of the waves does not occur and waves passed by the wire grid and reflected by the piston, instead of returning to the wire grid, are completely absorbed by the last-mentioned resistance element.

In order that the invention may be more readily carried into effect, several embodiments will now be described, by way of example, with reference to the accompanying drawing.

In the device shown diagrammatically in Figs. 1a, and 1b the wave guide GG contains a wire grid D on the head of a cylinder C, whilst a piston Z is arranged in the cylinder C at a distance from the grid D of a quarter of a wavelength of the waves in the wave guide behind the wire grid D. The waves incident from the left are polarized vertically, as shown by means of vector A in Fig. 1c. The direction of the wires of the grid D is at an angle $a$ with the direction of polarization of the incident waves. When these waves strike the wire grid D, the component E having a direction of polarization parallel to the direction of the wires of the wire grid, is reflected, resulting in a phase jump of 180°, since the component of the electric field parallel to the direction of the wires must be zero at the wire grid D. Consequently, a wave —E is reflected. However, the component L of the incident waves A is passed unhindered by the wire grid and reflected by the piston Z, again resulting in a phase jump of 180°. The transit time of these waves from the wire grid D to the piston Z and back likewise corresponds to another phase shift of 180 electric degrees. The waves reflected by the piston thus return to the wire grid D with the original phase L and are again passed by it unhindered. Superposition of the reflected waves L and —E results in a reflected wave R being formed, the amplitude of which is equal to that of the incident wave, but the direction of polarization of which is at an angle of 180° —2$a$ with this wave. By rotating the cylinder C about its axis with respect to the wave guide or shifting it in its longitudinal direction, it is possible to vary the direction of polarization or the phase of the reflected waves R with respect to the incident waves A.

Figures 2a and 2b show a variable phase shifter, in which use is made of the above-described device. The wave guides G1 and G2 are in this case coupled together by means of a directional coupling in the form of a narrow slit A in the common side-wall. The waves entering the wave guide G1 from the left are polarized vertically, so that these waves can propagate unhindered along the slit A in the wave guide G1 without wave energy passing to the wave guide G2. The wires of the wire grid D, arranged over the end of cylinder C, are at an angle of 45° with respect to the direction of polarization of the incoming waves, whilst in the interior of the cylinder C at a distance of a quarter of a wavelength from the grid D, the piston Z is arranged. The resultant of the waves reflected by the wire grid D and the piston Z is in this case at an angle of 90° with the incoming waves and hence passes through the coupling slit A into the wave guide G2, the dimensions of the coupling slit A being such that the directional coupling has a coupling factor equal to unity, so that the whole energy that is reflected passes to the wave guide G2 and reflected waves do not occur in front of the coupling slit in the wave guide G1. By shifting the cylinder C, together with the wire grid D, and the piston Z in the direction of length of the wave guide G1, the phase of the waves emerging via wave guide G2 may be varied at will with respect to the phase of the input waves of wave guide G1.

Fig. 3 shows how the invention can be used to provide a variable impedance, in which the wave guide GG contains a resistance element RE constituted by a horizontal mica strip on which a resistance material, for example finely-divided carbon, is provided. The surface of the strip RE is at right angles to the direction of polarization of the incident waves, so that these waves are not influenced by the strip RE. The direction of polarization of the reflected wave is dependent upon the direction of the wires of the wire grid D. The first component of the reflected wave, which is polarized in parallel with the surface of the strip RE, is fully absorbed by this strip, whereas the second component, the direction of polarization of which is the same as that of the incident waves, can pass the strip RE unhindered. By rotating the cylinder C together with the wire grid D, it is possible to vary the magnitude of said second component and by displacing the cylinder C in the direction of length of the wave guide GG it is possible to vary the phase angle of said second component. The impedance realized by the device may thus be varied at will. An advantage of this device consists in that the modulus and the argument of the reflection coefficient may be varied independently of one another and, if desired, read on a graduated scale.

What is claimed is:

1. Waveguide variable impedance apparatus comprising a waveguide, means for producing input electrical waves in said waveguide travelling in a given axial direction and polarized in a first direction transverse to said given direction, a grid of parallel elongated conductive members disposed in said waveguide in the path of said waves and lying in a plane perpendicular to said given direction, a planar wave reflective member positioned behind said grid a distance of one-quarter of a wavelength of said waves, a fixed resistance element positioned in front of said grid, said resistance element being oriented to selectively absorb wave energy polarized in a direction perpendicular to said first direction of polarization of the input waves, and means for independently rotating said grid about the axis of said waveguide and for moving said grid and wave reflective member longitudinally within said waveguide.

2. Waveguide variable impedance apparatus comprising a waveguide, means for producing input electrical waves in said wavelength travelling in a given axial direction and polarized in a first direction transverse to said given direction, a grid of parallel elongated conductive members disposed in said waveguide in the path of said waves and lying in a plane perpendicular to said given direction, a planar wave reflective member positioned behind said grid a distance of one-quarter of a wavelength of said waves, a strip of resistance material fixed within said waveguide in front of said grid and lying in a plane perpendicular to said first direction of polarization of said input waves, and means for independently rotating said grid and moving said grid and wave reflective member together longitudinally within said waveguide.

References Cited in the file of this patent

UNITED STATES PATENTS

| | | |
|---|---|---|
| 2,425,345 | Ring | Aug. 12, 1947 |
| 2,458,579 | Feldman | Jan. 11, 1949 |
| 2,476,034 | Fox | July 12, 1949 |
| 2,542,185 | Fox | Feb. 20, 1951 |
| 2,603,709 | Bowen | July 15, 1952 |
| 2,647,256 | Heilpern | July 28, 1953 |
| 2,760,166 | Fox | Aug. 21, 1956 |
| 2,808,571 | Cohn | Oct. 1, 1957 |
| 2,810,890 | Klopfenstein | Oct. 22, 1957 |

FOREIGN PATENTS

| | | |
|---|---|---|
| 664,926 | Great Britain | Jan. 16, 1952 |